United States Patent [19]

Minagawa et al.

[11] Patent Number: 5,758,627
[45] Date of Patent: Jun. 2, 1998

[54] FUEL FILTER FOR VEHICLE

[75] Inventors: Kazuji Minagawa, Tokoname; Makoto Miwa, Kariya; Kiyotoshi Oi, Toyohashi, all of Japan

[73] Assignee: Denso Corporation, Kariya, Japan

[21] Appl. No.: 816,423

[22] Filed: Mar. 14, 1997

[30]    Foreign Application Priority Data

Mar. 21, 1996  [JP]  Japan ................. 8-064904
Feb. 14, 1997  [JP]  Japan ................. 9-030408

[51] Int. Cl.⁶ ............................................. F02M 37/04
[52] U.S. Cl. ........................................ 123/509; 417/313
[58] Field of Search .............................. 123/509, 510, 123/514; 417/313

[56]    References Cited

U.S. PATENT DOCUMENTS 5,392,750  2/1995  Laue et al. ..................... 123/509
5,511,957  4/1996  Tuckey et al. ................. 123/313
5,564,396  10/1996  Kleppner et al. ............. 123/509
5,636,616  6/1997  Okane et al. ................... 123/510
5,647,330  7/1997  Sawert et al. ................. 123/509
5,649,514  7/1997  Okada et al. .................. 123/509
5,662,089  9/1997  Kleppner et al. ............. 123/509

FOREIGN PATENT DOCUMENTS 6-272634  9/1994  Japan.
8-177681  7/1996  Japan.

*Primary Examiner*—Thomas N. Moulis
*Attorney, Agent, or Firm*—Nixon & Vanderhye P.C.

[57]    ABSTRACT

A fuel filter having a filter element and fuel pump in a housing is disposed in a fuel tank. The filter element has a partition in contact with the fuel outlet side of the element. Fuel filtered by the element is divided into two stream passages, one of which is a return passage to the fuel tank and the other is a supply passage to fuel injectors of a common rail mounted on an engine. The amount of the stream returning to the tank is larger than the amount of the other stream so that a substantial amount of foreign particles in the fuel tank are carried by the returning stream and filtered. As a result, foreign particles may not so thickly accumulate on the filter portion in the supply passage.

15 Claims, 3 Drawing Sheets

---

FUEL FILTER FOR VEHICLE

CROSS REFERENCE TO RELATED APPLICATION

The present application is based on and claims priority from Japanese Patent Applications No. Hei 8-64904 filed on Mar. 21, 1997 and No. Hei 9-30408 filed on Feb. 13, 1997, the contents of which are incorporated herein by reference.

BACKGROUND OF THE INVENTION

1. Field of the Invention

The present invention relates to a fuel filter for a vehicle disposed in a fuel tank.

2. Description of the Related Art

A fuel supply system including a fuel pump disposed in a fuel tank, a fuel filter and a pressure regulator connected to the upstream side of the fuel filter has been used for supplying fuel from the fuel tank at a suitable pressure. The fuel pump is driven by an electric motor powered by a battery or an electric power source of a constant voltage.

In such a conventional system, the pressure loss of the filter increases as foreign particles accumulate on the filter element while the filter is being used for a long time. As a result, the fuel pressure at a downstream side of the fuel filter drops, and the air fuel ratio A/F of the fuel mixture formed in the engine cylinder changes to the leaner side at the higher speed range of the engine operation.

In general, the life of a filter element terminates when the pressure drop thereacross becomes a certain value such as 0.3 kgf/cm$^2$, and the amount of foreign particles to be removed by a fuel filter for its life is estimated to be 13.3 g. FIG. 5 shows the relationship between the amount of foreign particles filtered by and accumulated on the filtering area of the fuel filter and the pressure loss of fuel to be supplied with various sizes of filtering area.

Accordingly, it is necessary for a filter element for an engine which filters fuel at 120 liter/hour to have a filtering area of 980 mm$^2$, which is a substantial obstacle to reduction in the fuel filter size.

SUMMARY OF THE INVENTION

The present invention has an object of providing an improved fuel filter having a simple structure for preventing increase in the pressure loss thereacross.

For this purpose, a fuel filter according to the present invention to be disposed in a fuel tank is composed of a housing having an orifice opening to the fuel tank, a filter element and means, disposed in contact with the fuel outlet side of the filter element, for dividing fuel flowing therethrough into a stream of fuel flowing to the orifice and a stream of fuel flowing to the fuel outlet of the housing.

In the above fuel filter, the orifice has a size for controlling the amount of fuel returning to the fuel tank. In addition, the means for dividing fuel is preferably a partition disposed across the fuel outlet side of the filter element. The means for dividing fuel may have two chambers, one of which is connected to the orifice and the other of which is connected to the fuel outlet. The filter element is preferably provided with a honey-comb structure.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A fuel filter according to an embodiment of the present invention is described with reference to the appended drawings.

Figure 2:
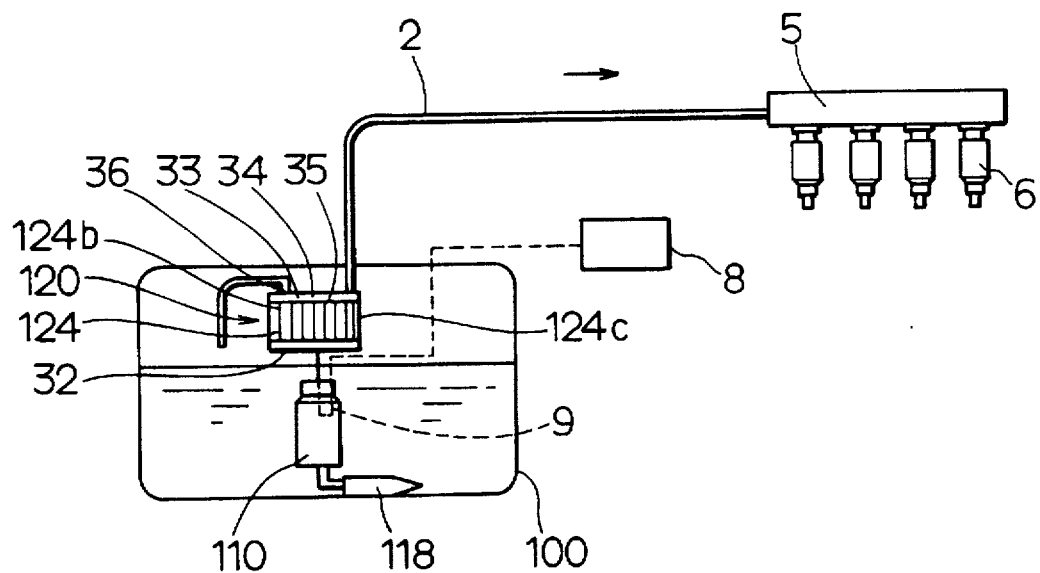
FIG. 2 is a schematic view illustrating a fuel supply system employing the fuel filter according to an embodiment of the present invention.

As shown in FIG. 2, a fuel pump 110 and a fuel filter 120 are accommodated in a fuel tank 100. The fuel pump 110 is controlled by a current control circuit 9 to supply fuel at a pressure according to a control signal sent from an electronic control unit 8. The fuel filter 120 removes foreign particles from the fuel, which is supplied through a fuel delivery pipe 2 to a pressure accumulator or common rail 5. The common rail 5 has a plurality of fuel injectors 6, which inject the fuel to an air intake pipe (not shown) according to engine operating conditions.

Figure 1:
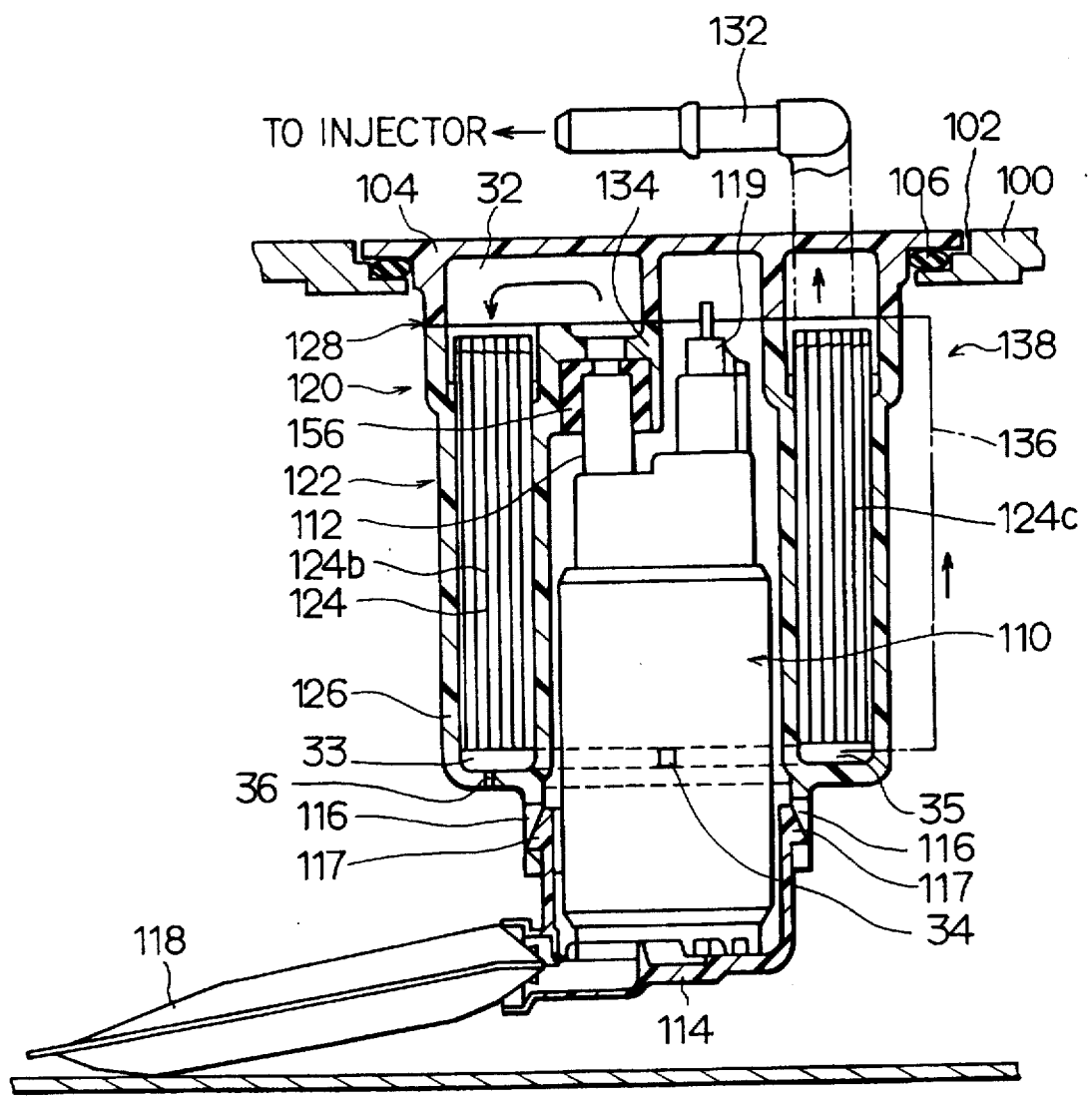
FIG. 1 is a cross-sectional view illustrating a fuel filter according to an embodiment of the present invention.
Figure 3:
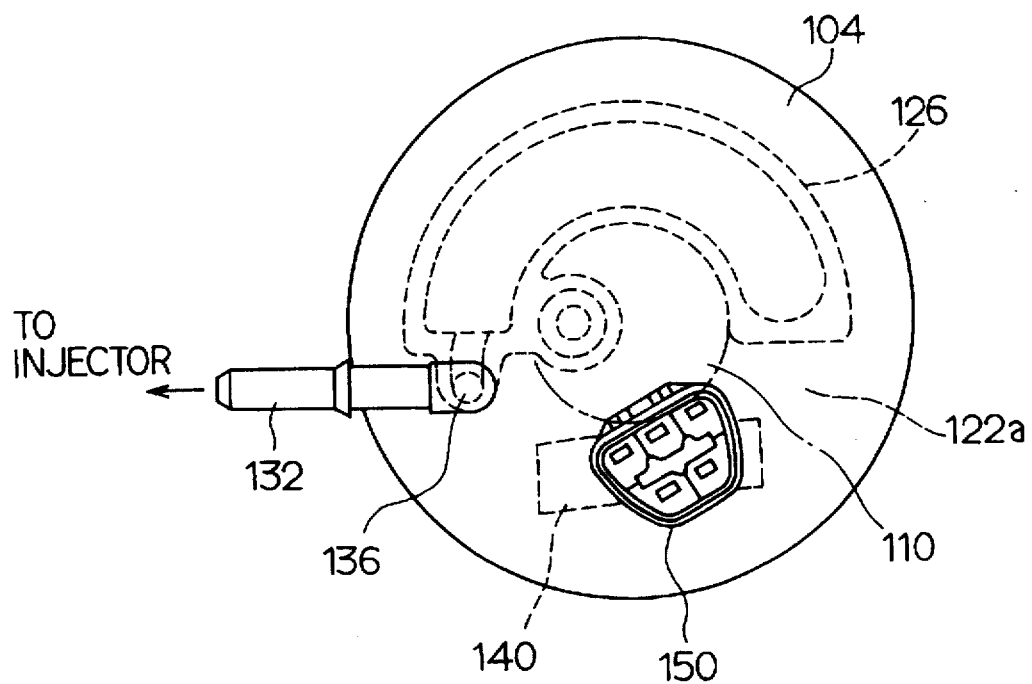
FIG. 3 is a plan view illustrating the fuel filter according to an embodiment of the present invention.

As shown in FIGS. 1 and 3, the fuel filter 120 is integrated into a unit which is composed of a cap 104, the fuel pump 110, a fuel level gauge 140, an electric connector 150 and a fuel outlet pipe 132.

The cap 104 is made of an insulating material, formed integrally with the outlet pipe 132 and fitted to an opening 102 of the fuel tank 100. The fuel filter 120 is composed of a housing 122 and a filter element 124 disposed in the housing 122, which includes the cap 104 and a lower housing 126. The lower housing 126 is made of a resinous material containing carbon fiber or carbon powder and has electric conductivity, which prevents static electricity otherwise generated when fuel is filtered. The cap 104 and the lower housing 126 join together on a plane 128 and seal the inside hermetically.

As shown in FIG. 3, the lower housing 126 has C-shaped outer and inner walls and a C-shaped inside space in which the filter element 124 is disposed. The fuel level gauge 140 is fixed to a space 122a outside the lower housing 126. A float (not shown, extends from the fuel gauge 140 to change resistance of a potentiometer (not shown) according to the fuel level of the fuel tank 100 in a well-known manner.

As shown in FIG. 1, an inlet 134 is formed at an upper portion of the lower housing 126 and connected through a gasket 156 to an outlet 112 extending from the fuel pump 110. An orifice 36 is formed at the bottom of the lower housing 126 to open to the inside of the tank 100. The outlet 112 has a check valve (not shown) to hold a fuel pressure while the fuel pump is not operated. A fuel pipe 136 is formed integrally with a wall of the lower housing 126 on an outer periphery thereof facing the space 122a. The fuel pipe 136 is connected to the outlet pipe 132 of the cap 104 to form a fuel passage 138 for supplying fuel to the injectors 6.

The fuel pump 110 is disposed in the space 122a adjacent to the outer surface of the C-shaped inner wall of the lower housing 126 and supported by a cup-shaped pump holder 114. The lower housing 120 has a lower skirt portion which has a plurality of openings 116 formed along the circumference thereof, and the cup-shaped holder 114 has a plurality of latches 117 on the outer periphery thereof, which engage the openings 116. Thus, the fuel pump 110 can be fixed to and removed from the housing 122.

A wire sieve bag (or mesh filter) 118 made of a resinous material is fixed to the pump holder 114. A fuel inlet of the fuel pump 110 opens into the inside of the wire sieve bag 118.

The fuel element 124 is made of a material such as glass fiber having affinity to the foreign particle to be filtered, especially, water. Water contained in the fuel is caught by the glass fiber, separated from the fuel and discharged to the bottom of the housing 122.

Figure 4:
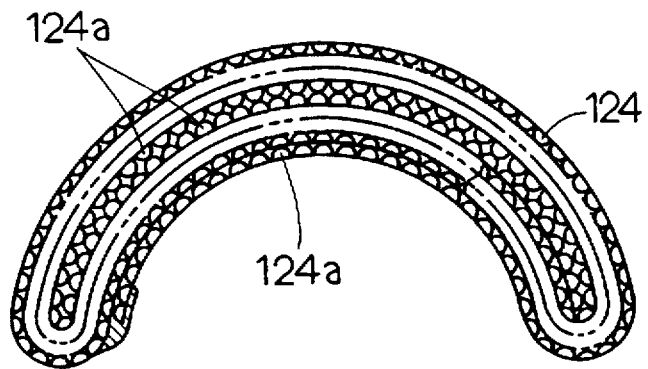
FIG. 4 is a scematic plan view illustrating a filter element of the fuel filter according to an embodiment of the present invention.

As shown in FIG. 4, the filter element 124 is formed of two longitudinal sheets, one of which is wavy and appended to the other flat sheet, and shaped into a C-shaped honey-comb member having many fuel passages 124a. An axial end of the filter element 124 is pressed to close and located to the bottom of the lower housing 126 as shown in FIG. 1.

As shown in FIG. 1, a fuel intake chamber 32 of the filter element 124 is formed at an upper portion of the housing 122, and first and second fuel outlet chambers 33, 35 of the filter element 124 are formed at bottom portions of the housing 122 or the lower housing 126 respectively with a partition 34 disposed therebetween.

The connector 150 has a plurality of terminal pins to be connected to a battery and the electronic control unit 8 located outside the fuel tank 100 and is integrated with the cap 104 at a portion above the space 122a. One of the terminal pins is connected to a connector 119 of the fuel pump 110 to supply electric power according to a signal of the control unit 8, and another is connected to the fuel level gauge 140 to send a fuel level signal to the control unit. The terminal pins are wedged, and portions of the cap 104 surrounding the terminal pins are sealed by a sealing material.

When the fuel pump 110 is energized through the connectors 150 and 119 to operate at a fuel pressure controlled by the current control circuit 9 according to a signal of the electronic control unit 8, the fuel pump 110 sucks fuel through the wire sieve bag 118 and discharges the fuel from the outlet 112 into the fuel intake chamber 32.

The discharged fuel flows down from the fuel intake chamber 32 to pass the filter element 124, and foreign particles in the fuel are removed. The filtered fuel is divided by the partition 34 into two streams, a first stream going to the first outlet chamber 33 and a second stream going to the second outlet chamber 35. Because the filter element has a honey-comb structure and divided outlet chamber, the fuel flowing through the filter element is apt to form separate streams going to the first and second chamber respectively. That is, the fuel flowing through the left portion (hereinafter referred to as the first filter portion) 124b of the fuel element 124 goes to the first outlet chamber 33, and the fuel flowing through the right portion (hereinafter referred to as the second filter portion) 124c goes to the second chamber 35.

The fuel in the first chamber returns to the fuel tank 100 through the orifice 36, and the fuel in the second outlet chamber 35 is supplied to the common rail 5 through the fuel pipe 136 and the fuel outlet pipe 132.

The amount of the fuel flowing through the first filter portion 124b is affected by the size of the orifice 36. In this embodiment, the diameter of the orifice is 0.5 mm. With a 2-liter-engine at a normal run, the flow rate of the fuel flowing through the first filter portion 124b is 10 liter–20 liter per hour, while the flow rate of the fuel flowing through the second filter portion 124c is 1–10 liter. As a result, a larger amount of the fuel flows through the first filter portion 124b, and foreign particles of the fuel are mainly removed by this first filter portion 124b. On the other hand, the amount of the fuel supplied to the common rail 5 is smaller and foreign particles barely accumulate on the second filter portion 124c, so that the pressure of the fuel supplied to the common rail can remain unchanged for a long time.

Although the foreign particles accumulated on the first filter portion 124b increases the pressure loss, the pressure of the fuel supplied to the common rail 5 does not decrease since the second filter portion 124c is separated from the first filter portion 124b.

Figure 5:
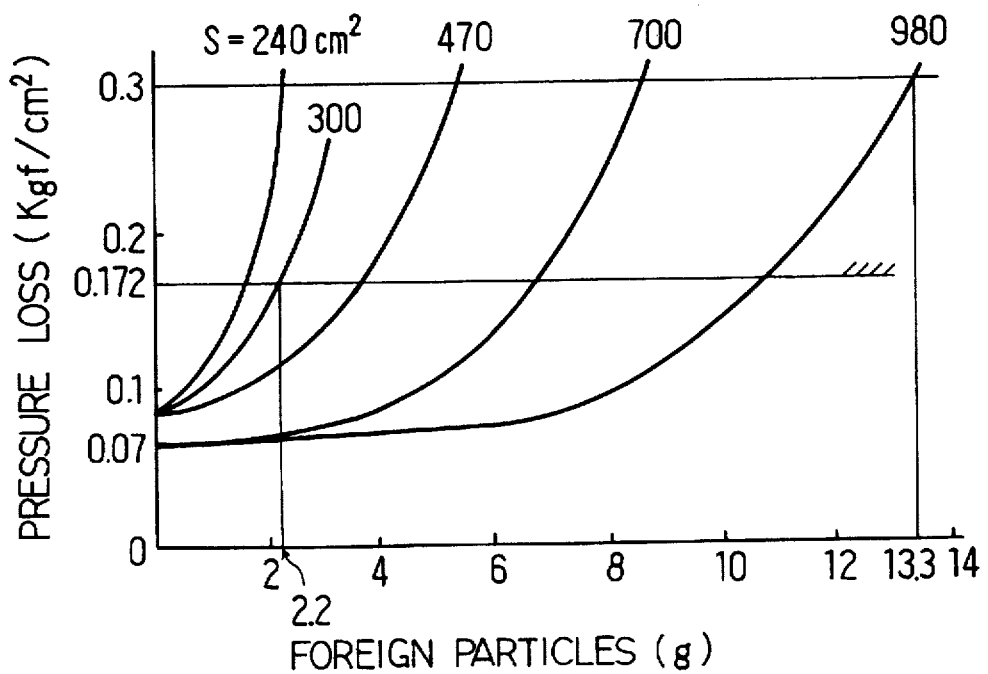
FIG. 5 is a graph showing relationship between the amount of foreign particles accumulated on the fuel filter and pressure loss of fuel to be supplied.

As a result, with a system in which the flow rate of the fuel supplied to the common rail is 2 liter/hour and the flow rate of the fuel returned to the tank 100 is 10 liter/hour, the filtering area of the filter element 124 according to the embodiment of the present invention can be much less than 300 $cm^2$ as shown in FIG. 5 because the filter element 124 is only required to remove foreign particles amounting to 2.2 gram for its life.

In this embodiment, the partition 34 is formed to divide a space on the outlet side (bottom side in FIG. 1) of the filter element 124 into two chambers. However, the intake side of the filter element 124 can be divided directly by a partition inserted therein. The fuel pressure can be controlled by a mechanical fuel pressure sensor disposed between the pump 110 and intake chamber 32 instead of the current control circuit 9.

A check valve can be disposed inside the fuel outlet pipe 132 to hold fuel pressure inside the housing 122 after the pump 110 is stopped.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A fuel filter to be disposed in a fuel tank comprising:
   a housing having a fuel inlet, a fuel outlet and an orifice opening to said fuel tank;
   a filter element disposed in said housing, said filter element having a fuel intake side and a fuel outlet side; and
   means, disposed in contact with said fuel outlet side of said filter element, for dividing fuel flowing therethrough into a stream of fuel flowing to said orifice and a stream of fuel flowing to said fuel outlet.

2. A fuel filter as claimed in claim 1, wherein said orifice has a size for controlling an amount of fuel returning to said fuel tank.

3. A fuel filter as claimed in claim 1, wherein said means for dividing fuel comprises a partition disposed across said fuel outlet side of said filter element.

4. A fuel filter as claimed in claim 1, wherein said means for dividing fuel comprises two chambers, one of which is connected to said orifice and the other of which is connected to said fuel outlet.

5. A fuel filter as claimed in claim 1, wherein said filter element is provided with a honey-comb structure.

6. A fuel filter as claimed in claim 3 further comprises a check valve disposed between said outlet side of said filter element and said fuel outlet.

7. A fuel filter as claimed in claim 1 further comprising a fuel pump having a pump inlet and a pump outlet and disposed in said housing, said pump inlet is connected to said fuel inlet of said housing, and said pump outlet is connected to said fuel intake-side of said filter element.

8. A fuel filter as claimed in claim 7, wherein said fuel outlet of said housing is connected to a common rail having a plurality of fuel injectors.

9. A fuel filter as claimed in claim 1, wherein said fuel outlet of said housing has a check valve therein.

10. A fuel filter as claimed in claim 7 further comprising means, disposed in said housing, for controlling pressure of fuel at said pump outlet.

11. A fuel filter for supplying fuel to an outside device from a fuel tank comprising:

a housing having a fuel inlet, a fuel outlet and an orifice opening to said fuel tank;

a filter element disposed in said housing, said filter element having a fuel intake side and a fuel outlet side;

a fuel pump disposed in said housing, said fuel pump having a pump inlet connected to said fuel inlet and a pump outlet connected to said fuel intake side of said filter element; and means, disposed in contact with said fuel outlet side of said filter element, for dividing fuel into a first stream of fuel flowing to said orifice and a second stream flowing to said fuel outlet, wherein an amount of said first stream is substantially larger than an amount of said second stream.

12. A fuel filter as claimed in claim 11 further comprising another filter element disposed at an upstream side of said fuel inlet of said housing.

13. A fuel filter as claimed in claim 11, wherein said housing is disposed in said fuel tank.

14. A fuel filter as claimed in claim 11 wherein said means for dividing fuel comprises a partition member disposed across said filter element.

15. A fuel filter as claimed in claim 11 further comprising means, disposed in said housing, for regulating pressure of fuel at said pump outlet.

* * * * *